United States Patent
Muessli

(10) Patent No.: US 6,548,948 B1
(45) Date of Patent: Apr. 15, 2003

(54) ENERGY SAVING LAMP WITH ELECTRONIC BALLAST

(75) Inventor: Daniel Muessli, Rumisberg (CH)

(73) Assignee: 7ton Holding AG (CH)

(*) Notice: Subject to any disclaimer, the term of this patent is extended or adjusted under 35 U.S.C. 154(b) by 0 days.

(21) Appl. No.: 09/807,496
(22) PCT Filed: Oct. 14, 1999
(86) PCT No.: PCT/EP99/07817
§ 371 (c)(1),
(2), (4) Date: Apr. 12, 2001
(87) PCT Pub. No.: WO00/22651
PCT Pub. Date: Apr. 20, 2000

(30) Foreign Application Priority Data

Oct. 14, 1998 (DE) ..................... 298 18 340 U

(51) Int. Cl.[7] .................................................. H01J 5/48
(52) U.S. Cl. .................................................. 313/318.01
(58) Field of Search ...................... 313/318.01, 318.02, 313/318.04, 318.09

(56) References Cited

U.S. PATENT DOCUMENTS 5,289,079 A * 2/1994 Wittmann ............... 313/318.02

FOREIGN PATENT DOCUMENTS

EP 0 534 728 A1 * 3/1993
JP 60-39758 * 3/1985

* cited by examiner

Primary Examiner—Gary Paumen
Assistant Examiner—Ann McCamey
(74) Attorney, Agent, or Firm—Friedrich Kueffner

(57) ABSTRACT

An energy saving lamp includes an electronic ballast with a printed board positioned upright in a lamp base, wherein all electronic components are provided on the printed board. The electronic components are arranged such that heat generated during operation is dissipated to the metallic fitting of the lamp base. The required insulation is provided by a base insulator of insulating material positioned between a fitting and a central contact. The gas discharge lamp further includes U-shaped gas tubes and is fastened on the lamp base with a lamp insert which is composed of two parts.

15 Claims, 6 Drawing Sheets

ENERGY SAVING LAMP WITH ELECTRONIC BALLAST

BACKGROUND OF THE INVENTION

1. Field of the Invention

The invention relates to energy saving lamps with electronic ballast.

2. Description of the Related Art

Energy saving lamps are conventionally constructed such that the user can exchange them without further measures against conventional incandescent lamps with Edison screw base, bayonet base or the like. For this reason, many energy saving lamps are provided with an Edison screw base, for example, of the size E 27/30.

DE-A 3611 611 discloses a standard circuit for the electronic ballasts. The following components can be differentiated: power rectifier with suppressing member and charging capacitor, inverse rectifier with two switching transistors and an oscillating circuit transformer with three metallically separated coils, lamp series reactor and gas discharge lamp.

The electric and electronic components of the ballast are conventionally placed onto a printed board with printed conductors.

In order to keep the energy saving lamp as compact as possible, it is generally attempted to integrate the electronic ballast into the lamp. However, there are two great obstacles for the required miniaturization.

The first obstacle are the high voltages to which the electronic device is exposed. These are alternating current supply voltages of 230 V, the direct current supply voltage of 400 V, and the lamp supply voltage which has values of 1,500 V and more before the ignition of the gas discharge.

The greatest obstacle, however, is the heat which is emitted by the electronic components of the ballast. Primarily, this concerns the switching transistors which, as a result of the relatively high oscillation frequency of 20 to 80 kHz, reach housing temperatures of approximately 140° C. Heat also is produced in the various reactors since they must be wound with wires of reduced thickness because of the required miniaturization. A further heat source is the magnetic stray fields which are emitted by the reactors, in particular, the series reactors of the lamp, and which induce in the neighboring metal parts, for example, the lamp base, corresponding short-circuit currents. Finally, the gas discharge lamp, in particular, its heating electrodes, also produces heat. The result of the described obstacles is that the electronic ballasts of the conventional energy saving lamps at least partially are seated externally to the lamp base and thus enlarge the constructive length, possibly also the diameter, of the energy saving lamps to a considerable extent in comparison to conventional incandescent lamps.

SUMMARY OF THE INVENTION

The present invention has the object to improve and further develop the known energy saving lamps such that the electronic ballast can be completely housed in a standard lamp base.

The solution according to the invention resides in a plurality of measures which enhance one another in order to thus achieve the set goal of housing the electronic ballast completely in the lamp base, preferably in a screw fitting of the size E 27.

Since the main problem, as described above, is the heat development, first a suitable heat sink was searched for the switching transistors and was indeed found in the form of the metallic outer contact part of the lamp base. The switching transistors are thus arranged on the printed board such that their heat can be transmitted well onto the metal parts of the lamp base. Preferably, the switching transistors are arranged such that their cooling bodies rest against the base insulator of the lamp base so that special insulating measures are obsolete.

While in the known energy saving lamps the printed board is positioned external to the lamp base, pursuant to the solution according to the invention it is positioned directly within the lamp base. Here it is secured by means of a special inner lid which is placed on top of the lamp base, preferably is non-detachably snapped onto it.

For this purpose, the lamp base according to a further development has at its upper edge several, preferably four, penetrations, and the inner lid an edge with corresponding locking cams. In this way it is ensured that the inner lid cannot be removed accidentally. The electrical safety is thus ensured.

Preferably, the inner lid is configured such that it tightly closes off the lamp base. Accordingly, the electronic components as well as the conductors of the printed board are protected against damaging effects of air pollutants, air moisture and the like.

According to an embodiment of the invention, the inner lid is metallized at the exterior. This metallization acts as a shield and at the same time as a light reflector.

An especially space-saving, assembly cost-saving, and assembly time-saving solution was realized for an oscillating frequency transformer and its three metallically separated coils. The annular core has a flat rectangular shape and is seated in a matching recess in the printed board. The three coils are configured as printed conductors, wherein a semi-winding is positioned on the printed board and the corresponding second semi-winding on an additional board, respectively. The oscillating circuit transformer is completed in that the additional board is inserted upside-down through the annular core and is placed onto the printed board. After soldering of the corresponding semi-windings the transformer is complete. At the same time, the annular core is fixed on the printed board.

Also, the shape and arrangement of the lamp ballast contributes to the miniaturization of the electronic ballast. An open ferrite body is used as the coil body so that the wire windings can be applied very simply. The wound coil body is then inserted into a recess preferably at the upper edge of the printed board and glued thereto. In this way, the lamp ballast has a maximum spacing to the metal parts of the lamp base and a minimal spacing to the gas discharge lamp.

However, it was found that the lamp ballast produces considerable stray fields which induce in the metal parts of the lamp base considerable short-circuit currents. For this reason, a U-shaped magnet core is additionally provided which covers with a sufficient air gap the wound ferrite coil body. This U-shaped core reduces the stray fields of the reactor. At the same time, it provides the possibility of changing the inductivity and thus the alternating current resistance of the series reactor during the production in a targeted way so that gas discharge lamps of different power can be operated on otherwise identical ballasts.

In addition, a two-sided metallization of the printed board also contributes to the miniaturization of the electronic ballast.

In all energy saving lamps the gas discharge lamp, which, as is known, is comprised of one or more gas tubes usually folded in a U-shape, must be mechanically securely and permanently connected to the lamp base. For this purpose, conventionally a base insert of insulating material is used which is, on the one hand, connected to the lamp base and on which, on the other hand, the gas discharge lamp is fastened, generally by means of a so-called cement.

In the energy saving lamp according to the invention such a base insert is also used. It is of a two-part configuration wherein the lower part according to an advantageous embodiment has a central opening whose diameter is larger than the diameter of the outer contact part but smaller than the diameter of the edge of the lamp base.

In the case that a so-called glass envelope is to be placed about the gas discharge tube, for example, in the shape of an incandescent lamp, the gas discharge lamp can also be attached in the following way.

According to a further development, a securing device is provided on the inner lid which matches the shape and length of the glass tube or glass tubes of the gas discharge lamp and secures it by clamping. It is understood that the springy elements of the securing device are positioned at the center of the gas discharge lamp so that the radiation of the light is not impair.

The permanent attachment between the gas discharge lamp and the securing device on the lid can be realized with a suitable adhesive.

According to a preferred configuration of the invention, an additional securing bracket is provided which secures the gas discharge lamp, for example, in the area of the so-called hotkiss. On the inner lid additional devices are then provided on which the securing bracket is anchored.

Further embodiments of the invention are the subject matter of the remaining dependent claims.

BRIEF DESCRIPTION OF THE DRAWINGS

With the aid of the drawing, the invention will be explained in more detail in the form of embodiments. It is shown in.

DETAILED DESCRIPTION OF THE INVENTION

Figure 1:
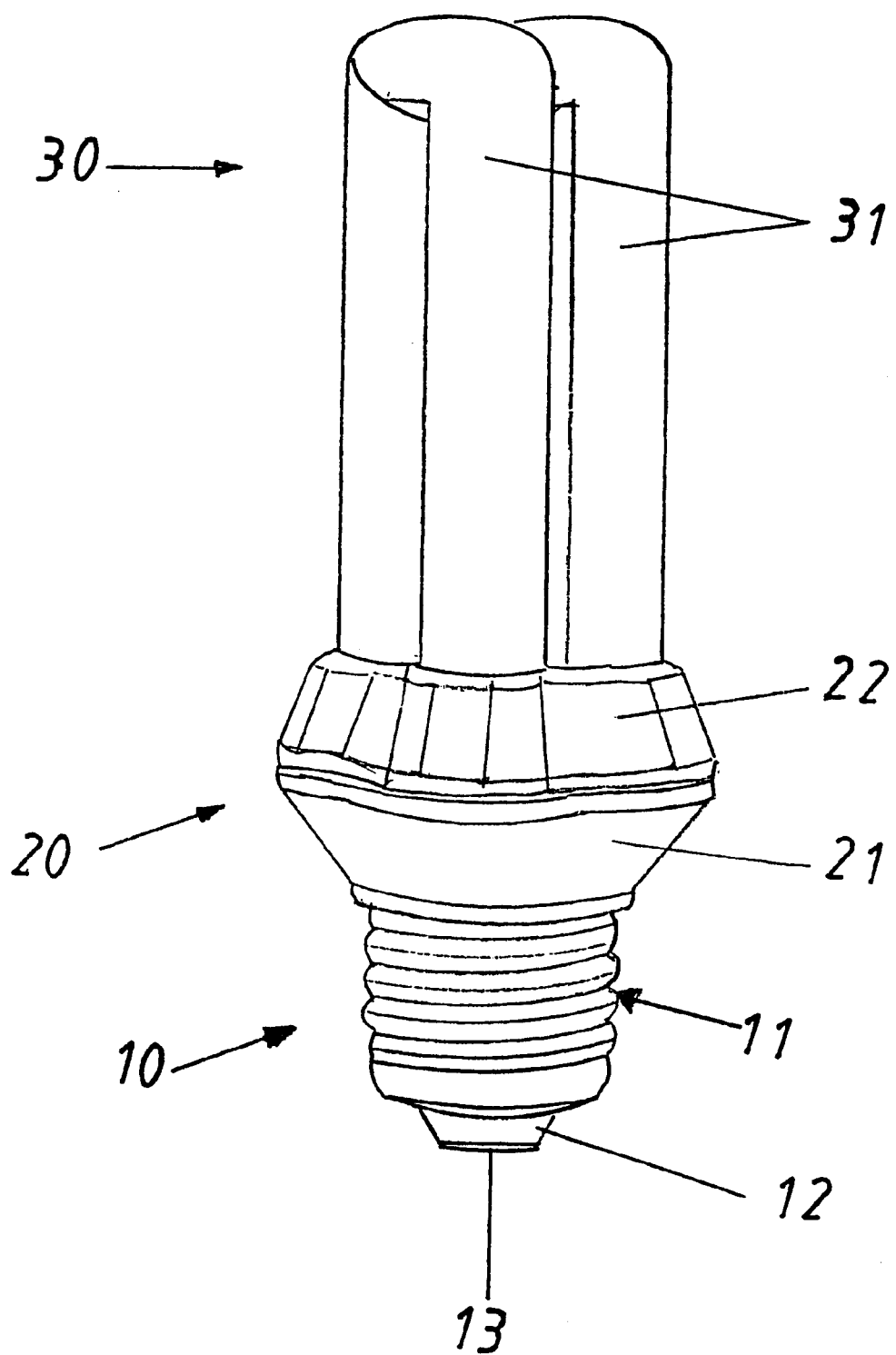
FIG. 1 an energy saving lamp in a perspective illustration.

FIG. 1 shows in a perspective illustration an energy saving lamp comprised substantially of a lamp base 10, here in the shape of a screw fitting with Edison screw base E 27. Shown is a thread 11, a central contact 13, and a base insulator 12 connecting the two and comprised of insulating material.

Furthermore, shown is a gas discharge lamp 30, comprised of two glass tubes 31 folded in a U-shape. Finally, a lamp insert 20 comprised of an upper part 22 and a lower part 21 is shown which connects the lamp base 10 and the gas discharge lamp 30 with one another and covers the ends of the glass tubes 31.

Figure 2:
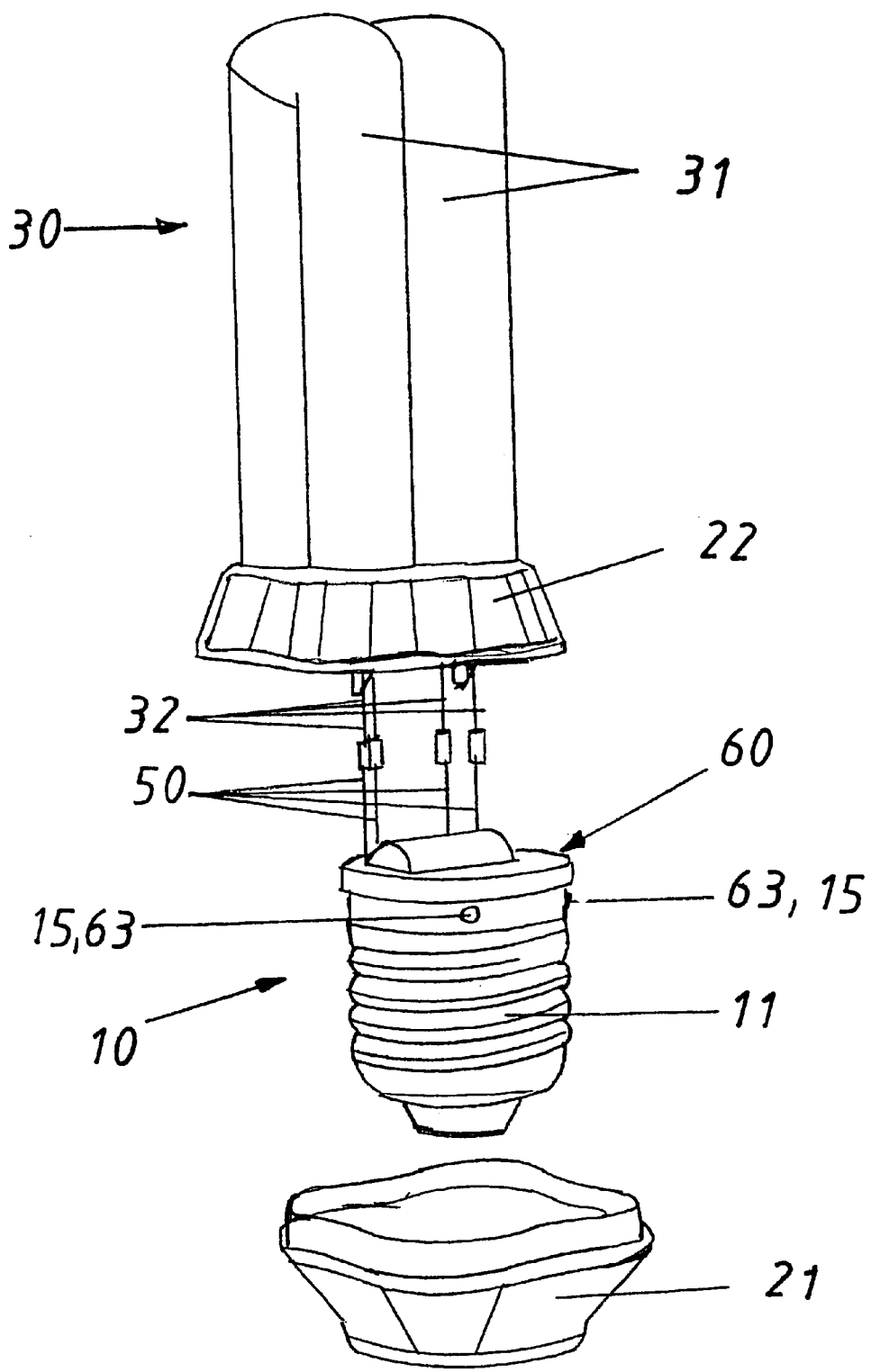
FIG. 2 the energy saving lamp of FIG. 1 in a partially exploded view.

FIG. 2 shows the energy saving lamp of FIG. 1 in an exploded view. The lamp base 10 is shown which is closed by an inner lid 60. The latter will be explained in more detail with the aid of FIGS. 5 and 6.

Figure 4:
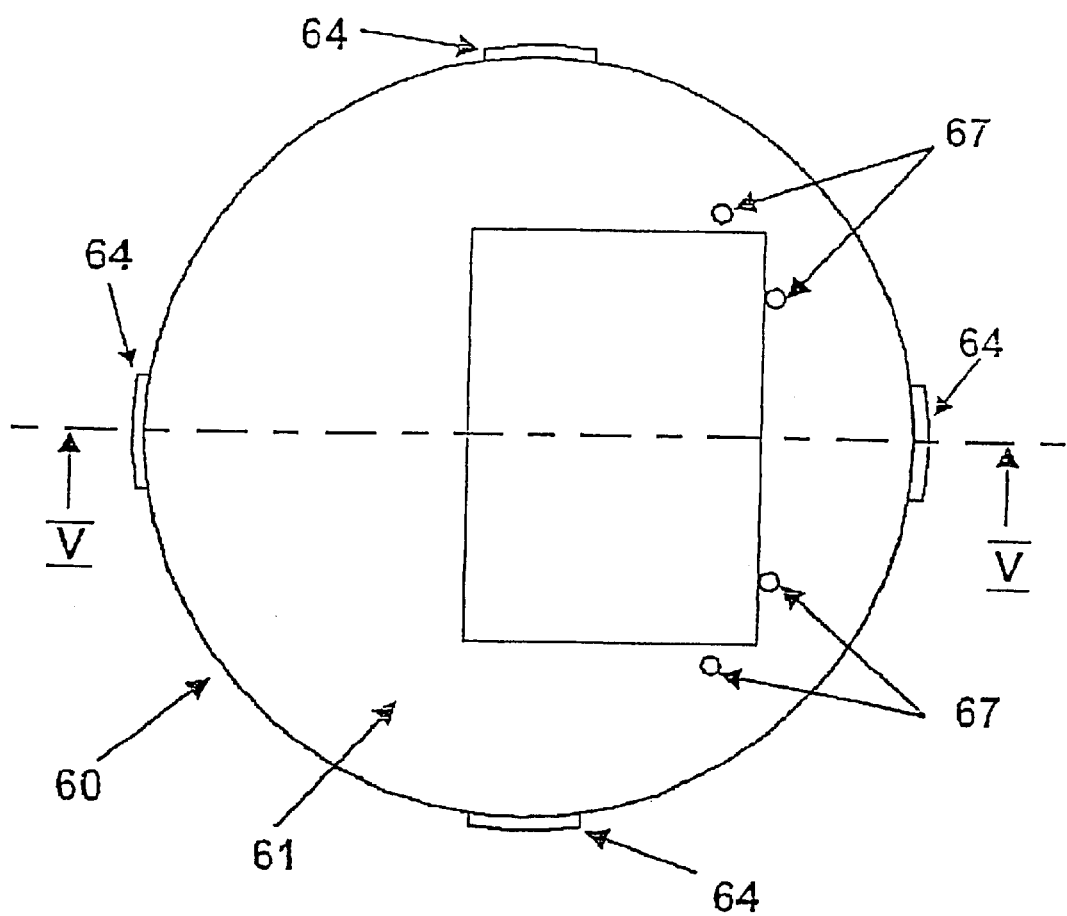
FIG. 4 a plan view onto a first inner lid which closes off the lamp base.

Also shown are connecting wires 50, projecting from the inner lid 60, of the electronic ballast, mounted in the lamp base 10 and to be explained in more detail with the aid of FIG. 4, and the connecting wires 32 of the gas discharge lamp 30 melted into the glass tubes 31.

The illustration of FIG. 2 shows that the energy saving lamp can be assembled with the lower part 21 of the lamp insert 20 removed. When the connecting wires 32, 50 are connected to one another, the lower part 21 of the lamp insert 20 is slipped onto the lamp base 10. For this purpose, it has a central opening whose diameter is greater than the diameter of the thread 11 but smaller than the diameter of the upper edge of the base 10. As soon as the two parts 21, 22 of the lamp insert are connected to one another, for example, by welding or gluing, the energy saving lamp as illustrated in FIG. 1 is complete.

Figure 3:
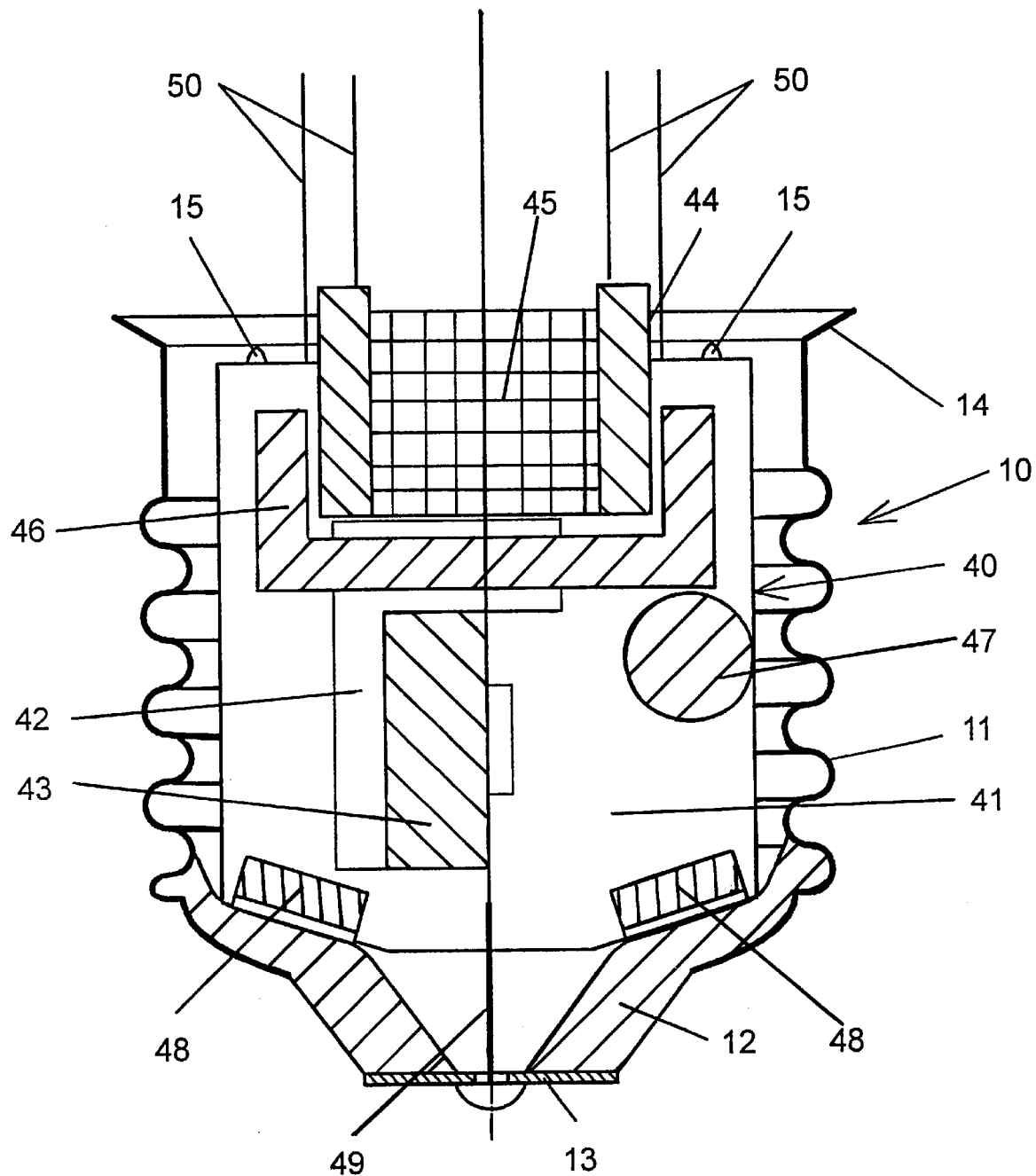
FIG. 3 a longitudinal section of the lamp base with the electronic ballast of the energy saving lamp according to FIG. 1.
Figure 5:
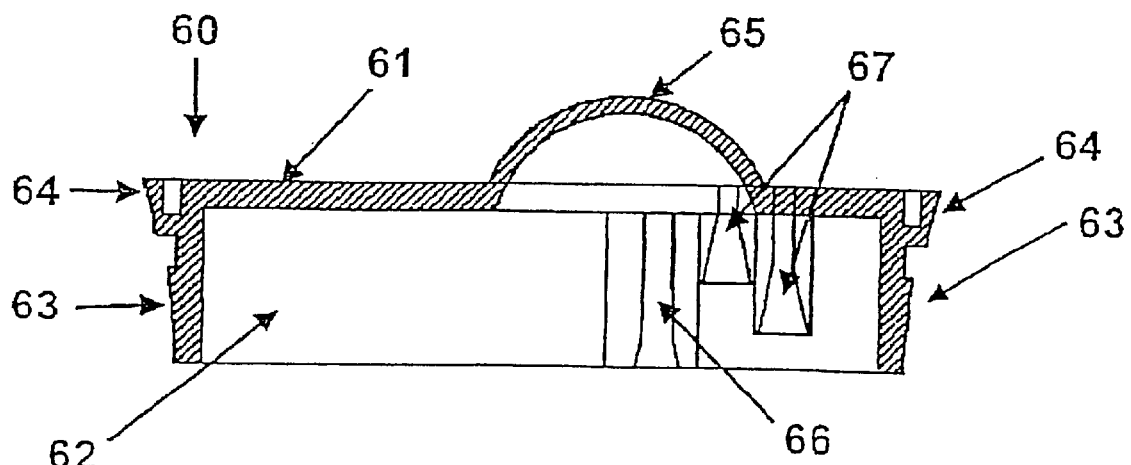
FIG. 5 a section of the inner lid of FIG. 4 along the line V—V.

The metal fitting 11 has four penetrations 15 arranged in the area of the upper rim and distributed about the periphery (see FIG. 3), wherein four catch grooves 63, arranged on the inner lid 60, are snapped into place therein (see FIGS. 4 and 5). Accordingly, the inner lid 60 is non-detachably seated on the lamp base 10 so that the electronic ballast 40 (FIG. 3) mounted in the lamp base 10 is protected against outer effects such as air pollution, air moisture and the like. The connecting wires 50 to the electronic ballast 40 are guided through corresponding openings 67 in the inner lid 60. FIG. 3 show schematically a longitudinal section of the screw fitting 10. Illustrated are the metal fitting 11, the central contact 13, and the base insulator 12 of insulating material connecting the two to one another.

The supporting element of the electronic ballast 40 is a printed board 41 which is standing upright in the base 10. The printed board 41 is provided on both sides with conductors and supports all electric and electronic components. Of these however only those required for understanding the invention are illustrated.

A series reactor of the lamp is seated in a cutout of the printed board 41 on the upper edge and is comprised of a ferrite coil body 44 with coil 45 and a U-shaped magnetic core 46 surrounding the coil body 44 with a sufficient air gap. The U-shaped core 46 has the task of intercepting the significant stray fields emitted by the reactor 44, 45 so that no heat-generating short-circuit currents are generated in the metal fitting 11. At the same time, the U-shaped core 46 provides the possibility, by changing its position, to change the inductivity of the series reactor 44, 45 of the lamp and thus of its alternating current resistance. With this measure, gas discharge lamps 30 with different power uptake can be operated with the otherwise unchanged electronic ballast 40.

At the lower end of the printed board 41 the two switching transistors 48 are shown to the right and the left. They are arranged such that their cooling bodies rests against the base insulator 12. Accordingly, the lost heat generated in the switching transistors 48 reaches on the shortest possible path the metal fitting 11 which thus serves as a heat sink. Since the base insulator 12 is comprised of insulating material, other insulating measures are obsolete.

At the center of the printed board 41 the annular core 43 of the oscillating circuit transformer is shown. The printed board 41 has at this location a cutout so that the annular core 43 projects approximately with one half past the front side and one half past the backside of the printed board 41. It is secured by an additional board 42 which is pushed through the annular core 43.

The three coils of the oscillating circuit transformer are realized as printed coils (not illustrated) wherein one half of the coils is arranged, respectively, on the printed board 41, the other half, respectively, on the additional board 42. The additional board 42 is placed upside-down onto the printed board 41 so that the corresponding partial coils can be soldered to one another. In this way, the three coils can be produced much more quickly and in a more space-saving way in comparison to conventional ballasts in which three wire coils must be wound by hand onto the annular core and must be finally soldered to the printed board.

As a third magnetic component the magnetic core 47 of the mains suppressing reactor is positioned on the printed board 41.

FIG. 4 shows a plan view and FIG. 5 a section of a first inner lid 60. It has a base plate 61 having underneath it a peripheral rim 62. The rim 62 supports on its outer side the locking cams 63 which connect the inner lid 60 non-detachably to the lamp base 10.

On the inner side of the lid rim 62 two securing grooves 66 are provided opposite one another which secure the printed board 41 to the right and to the left so that it stands securely within the lamp base 10.

The base plate 61 of the inner lid 60 has four openings 67, provided on the inner side with nozzles through which the connecting wires 50 of the electronic ballast 40 are guided. Noses 64 on the periphery of the inner lid 60 prevent that the inner lid 60 can be pressed into the lamp base 10. A bulge 65 provides space for the series reactor 44, 45 of the lamp.

Figure 7:
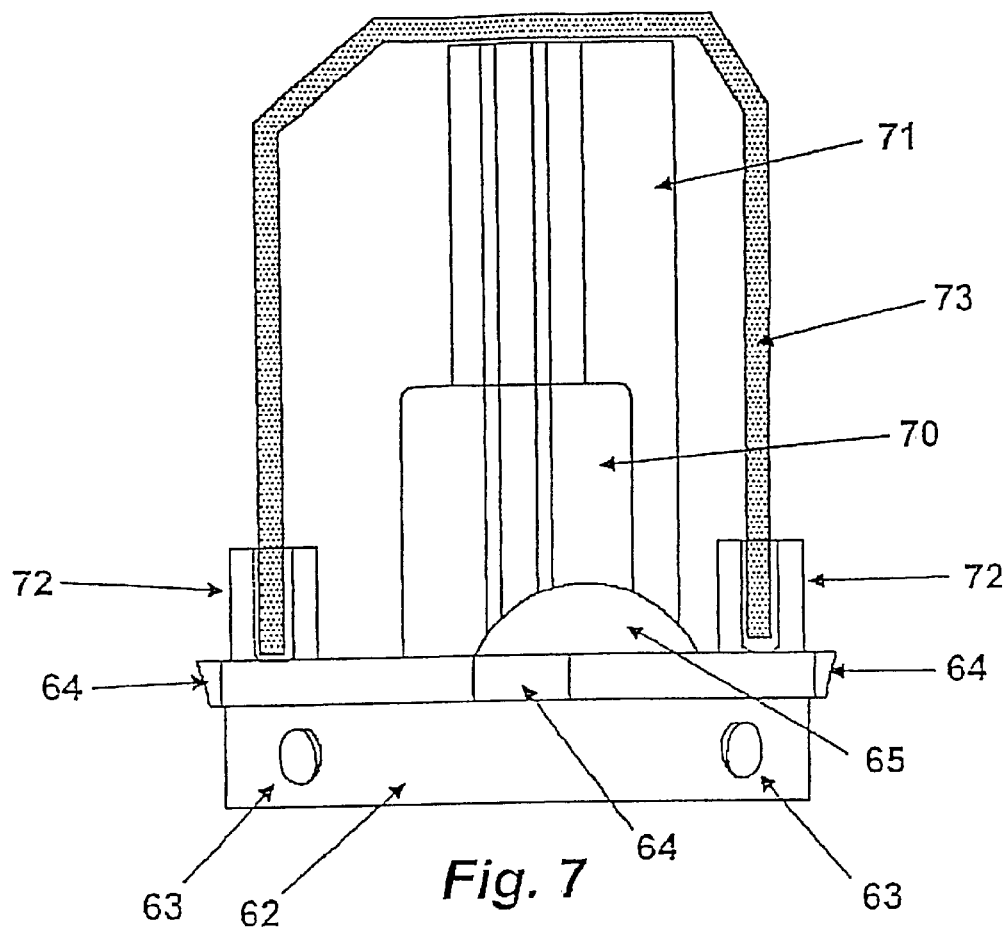
FIG. 7 a side view of the inner lid of FIG. 6.
Figure 6:
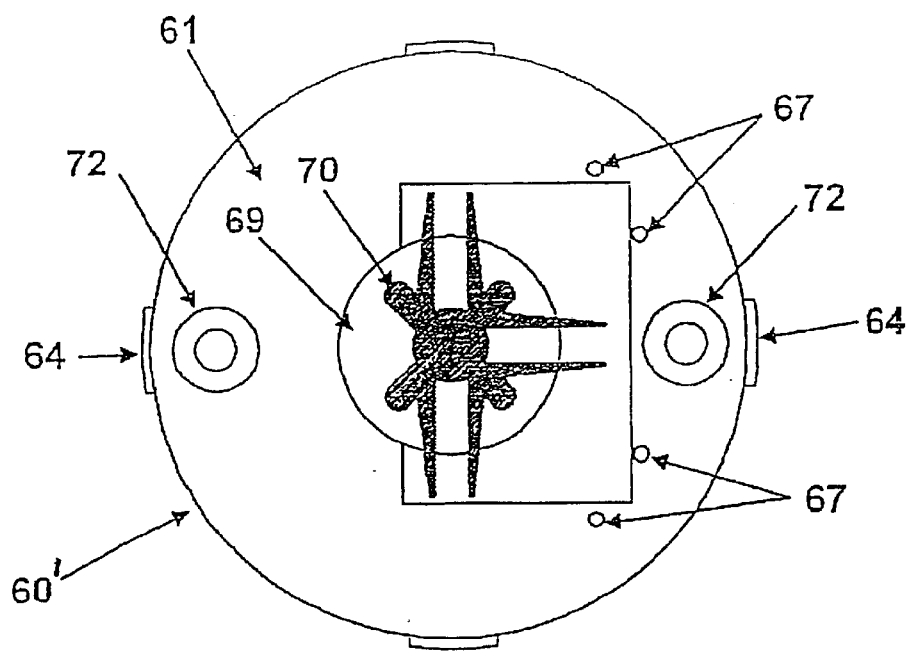
FIG. 6 a plan view onto a second inner lid.

FIGS. 6 and 7 show a second inner lid 60' which is envisioned, in particular, for energy saving lamps which have a glass envelope (FIG. 8), for example, in the shape of an incandescent lamp. The second inner lid 60' differs from the first inner lid 60 in that on its outer side a lamp securing device 70, 71 is provided. This lamp securing device 70, 71 is shaped such that the glass tubes 31 of the gas discharge lamp 30 can be placed on top of it. When doing so, elastic lips come to rest from the interior against the glass tubes 31 and secure them by friction. The light radiation generated by the gas discharge lamp 30 is not impaired by this.

For a permanent attachment of the gas discharge lamp 30 on the lamp securing device 70, 71 a suitable adhesive can be used, for example, a silicone adhesive or a cement.

FIG. 7 shows a further device for permanent attachment of the gas discharge lamp. It is a securing bracket 73 whose ends are anchored on the securing devices 72 and which is guided across the hotkiss of the gas discharge lamp 30.

Figure 8:
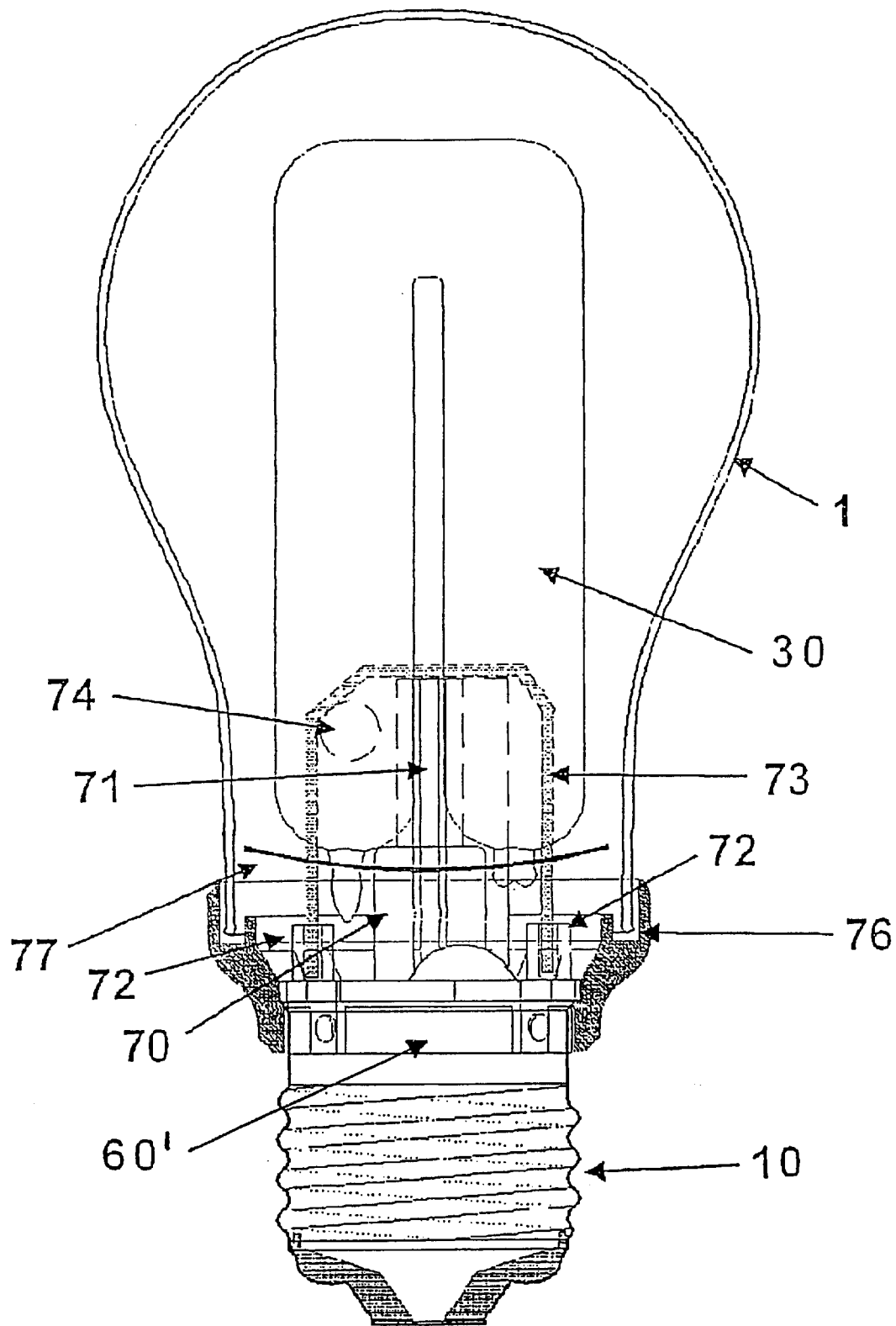
FIG. 8 a partial longitudinal section of an energy saving lamp with glass envelope.

FIG. 8 shows a partial longitudinal section of an energy saving lamp wherein the gas discharge lamp 75 is covered by a glass envelope 1 in the shape of an incandescent lamp. The gas discharge lamp 75 is seated on the inner lid 60' of FIGS. 6 and 7. The securing bracket 73, whose ends are anchored on the securing devices 72, is guided across the hotkiss 74 of the gas discharge lamp 75. The connection between the lamp base 10 and the glass envelope 1 is provided by a base insert 76. Below the gas discharge lamp 30, a reflector 77 is arranged which reflects the light of the gas discharge lamp 30 and primarily the heat of the heating spirals in the gas discharge lamp 30 in the upward direction so that the electronic ballast mounted in the base 10 is not additionally heated.

What is claimed is:

1. An energy-saving lamp, comprising
    a lamp base comprised of an outer contact part and a central contact, and a base insulator of insulating material arranged between the outer contact part and the central contact,
    a gas discharge lamp comprised of at least one glass tube with connecting wires melted therein,
    a lamp insert comprised of an upper part and a lower part, wherein the upper part covers an end of the glass tube and the connecting wires, and wherein the lower part provides a mechanical connection with the lamp base,
    an electronic ballast for generating an alternating supply voltage required for the operation of the gas discharge lamp, wherein the electronic ballast comprises a printed board on which electric and electronic components are mounted and connected, wherein the electric and electronic components are a mains suppressing reactor, a lamp series reactor, an oscillating circuit transformer with three metallically separated coils, two switching transistors, and connecting wires to the gas discharge lamp,
    wherein the printed board extends upright in the lamp base,
    the switching transistors having cooling bodies mounted so as to be insulated relative to the lamp base,
    the lamp series reactor being comprised of an open coil body supporting a coil, and a U-shaped core covering the coil body with a sufficiently large air gap, wherein the coil body is seated in a cutout on an edge of the printed board,
    the oscillating circuit transformer being comprised of a flat rectangular annular core and being seated in a cutout in the printed board,
    the three coils being formed as printed conductors, wherein one half of the coils are positioned on the printed board, and the other half of the coils are positioned on an additional board,
    the additional board being inserted upside-down through the annular core and corresponding partial coils being soldered to one another, and
    an inner lid being placed on the lamp base, wherein the inner lid comprises locking grooves for securing the printed board laterally, and openings for the connecting wires to the gas discharge lamp.

2. The energy saving lamp according to claim 1, wherein the inner lid sealingly closes the lamp base.

3. The energy saving lamp according to claim 1, wherein an outer side of the inner lid is at least partially metallized.

4. The energy saving lamp according to claim 1, further comprising a reflector positioned between the inner lid and the gas discharge lamp.

5. The energy saving lamp according to claim 1, wherein the lower part of the base insert has a central opening with a diameter greater than a diameter of the outer contact part but smaller than a diameter of the edge of the lamp base.

6. The energy saving lamp according to claim 1, wherein the printed board is metallized on two sides.

7. The energy saving lamp according to claim 1, wherein the switching transistors rest with the coiling bodies thereof against the base insulator.

8. The energy saving lamp according to claim 1, wherein the lamp base is a screw fitting with Edison screw base E27.

9. The energy saving lamp according to claim 1, wherein the lamp base comprises below a free edge thereof several penetrations distributed about the periphery, wherein the inner lid has a rim configured to fit into the lamp base, and wherein locking cams matching the penetrations are provided on the rim.

10. The energy saving lamp according to claim 9, wherein the lamp base comprises four penetrations.

11. The energy saving lamp according to claim 9, wherein the locking cams non-detachably connect the inner lid to the lamp base.

12. The energy saving lamp according to claim 1, further comprising a securing device mounted on the inner lid, wherein the securing device matches the at least one glass tube of the gas discharge lamp and is configured to springily clamp the at least one glass tube.

13. The energy saving lamp according to claim 12, further comprising addtional devices for anchoring a securing bracket, wherein the securing bracket secures the gas discharge lamp.

14. The energy saving lamp according to claim 1, wherein the coil body of the series reactor of the lamp is seated in an upper edge of the printed board, and wherein the U-shaped core is seated on a backside of the additional board.

15. Thee energy saving lamp according to claim 14, wherein the coil body is seated in a cutout of the upper edge of the printed board.

* * * * *